Jan. 24, 1967  R. HANSCHITZ  3,299,924
ROTATING COMMINUTING ATTACHMENT FOR USE WITH PORTABLE
KITCHEN APPLIANCES OF THE ELECTRIC MIXER-TYPE
Filed Feb. 10, 1964

INVENTOR.
RUDOLF HANSCHITZ

McGlew & Toren
ATTORNEYS.

United States Patent Office 3,299,924
Patented Jan. 24, 1967

3,299,924
ROTATING COMMINUTING ATTACHMENT FOR USE WITH PORTABLE KITCHEN APPLIANCES OF THE ELECTRIC MIXER-TYPE
Rudolf Hanschitz, Siegenbergstrasse 11, Reichenbach, Fils, Wurttemberg, Germany
Filed Feb. 10, 1964, Ser. No. 343,753
Claims priority, application Germany, Feb. 12, 1963, E 24,321
7 Claims. (Cl. 146—68)

This invention relates to comminuting devices and, more particularly, to a rotating comminuting attachment for kitchen appliances, of the electric mixer-type including an electric motor driving an output coupling through reduction gearing, whereby the comminuting attachment may be driven at an angular velocity substantially less than that of the motor armature.

Electric motor driven portable kitchen appliances of the electric mixer-type are well known and in common use. In these appliances, the armature shaft of the electric motor drives an output coupling at a substantially reduced speed through a built-in reduction gearing. The output coupling is arranged to be disengageably coupled to the driving shaft or shafts of mixing or beating tools, so that these tools may be inserted in or dipped into a relatively pliable mass such as a cake dough, the white of an egg, or other mass to be mixed or stirred. The mass to be operated on is accommodated in a suitable container such as, for example, a metal or earthenware bowl. Those kitchen appliances which are primarily intended for mixing or beating are not suitable for cutting or comminuting relatively solid foodstuff, such as vegetables, for example, to chop such foodstuff into tiny pieces.

There are known rotary comminuting machines by which solid material can be comminuted in the presence of a liquid, and by using a comminuting tool which is rotated at a very high speed equal to the speed of the motor armature, for example. Machines of this type are used, for example, in forming emulsions. However, the rotating comminuting members of such known apparatus are not adaptable at all either to use with kitchen appliances or for comminuting solid material, such as vegetables, in the absence of liquid.

The present invention is directed to a rotating comminuting attachment which may be used with portable kitchen appliances of the mentioned electric mixer-type. To this end, the comminuting attachment of the present invention includes a drive shaft formed at its upper end for coupling to the output coupling of an electric mixer or similar portable kitchen appliance. Thereby, the comminuting attachment is rotated at an angular velocity substantially less than that of the motor armature. A knife blade is secured to the lower end of the drive shaft, and includes at least two radially extending wings having cutting edges at their radially outer ends.

A stationary downwardly opening bell is provided in surrounding relation with the knife blade and is formed with counter cutting edges cooperable with the cutting edges at the radially outer ends of the knife blade wings to comminute solid food material, such as vegetables. In addition, the lower edges of the wings of the knife blade are preferably formed as cutting edges to that these cutting edges can effect pre-cutting of the material to be comminuted.

The material to be comminuted, such as vegetables, is positioned in an earthenware or metal bowl or container, and the comminuting attachment, after coupling to the output coupling of the kitchen appliance is inserted from above into the container so as to engage the solid matter or solid body to be cut. By pressing down on the appliance, the material to be cut will enter between the rotating knife blade wings and the cutting edges provided in the bell and thus be cut into relatively small pieces. The cutting edges extending along the lower edges of the knife blade wings operate directly upon the material to be cut to effect an initial comminution or pre-cutting thereof.

In order to increase the efficiency of operation of the material to be cut, the wings of the knife blade are preferably bent in a trailing direction relative to radaii of the drive shaft, so that the knife blade wings form acute angles with the circumferential wall of the hood or bell. Furthermore, the wings of the knife blade also may be offset or twisted in order to obtain a slanted or inclined position of the cutting edges on the radially outer ends thereof, such inclined or slanted position being with respect to the cutting edges in the circumferential wall of the bell or hood, and which latter cutting edges extend parallel to the diameter of the drive shaft.

A support or bearing member, preferably in the form of a tubular sleeve, has its lower end fixedly secured to the hood and encloses the major portion of the drive shaft, and this bearing member is so connected with the drive shaft that it forms one constructional unit with the latter, and which unit is disengageably connectable with the kitchen appliance. The support member and the appliance casing are interengaged in such a manner that the support member is fixed against rotation. The drive shaft carrying the knife blade is positioned in the support sleeve in such a manner that it is movable axially, and a spring is provided in operative relation with the drive shaft to continuously press the knife blade into the bell, or into the upper operative or working position.

For an understanding of the principles of the invention, reference is made to the following description of a typical embodiment thereof as illustrated in the accompanying drawings.

Figure 1:
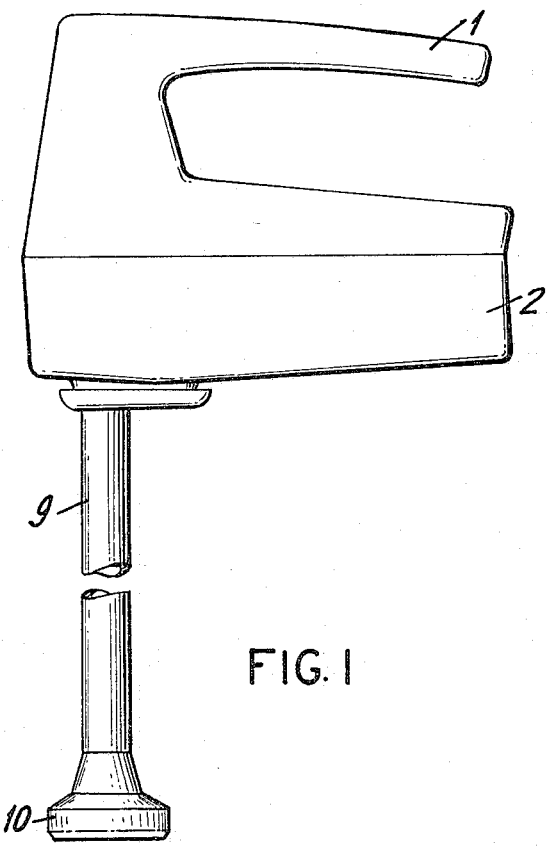
FIG. 1 is a side elevation view of a known form of kitchen appliance having the comminuting attachment of the invention coupled thereto.
Figure 2:
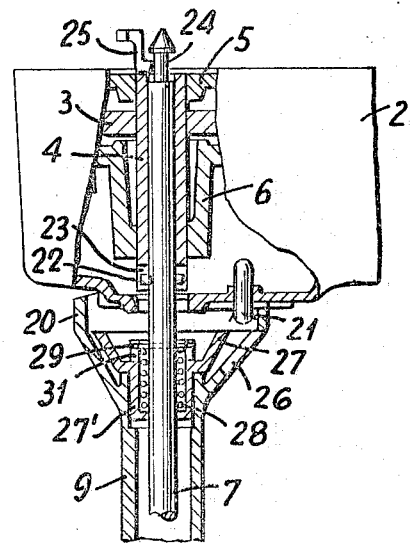
FIG. 2 is a partial side elevation view, partly in section, of the lower portion of the kitchen appliance and the coupled comminuting attachment shown in FIG. 1.

Referring more particularly to FIGS. 1 and 2 of the drawings, a known type of manually portable kitchen appliance is illustrated as including a handle 1 connected to a casing 2. An electric motor (not shown) in casing 2 drives a reduction gearing, such as a worm and worm gear reduction gearing including a worm gear 3 shown in FIG. 2 as fixedly connected with a hub 4 constitutes an output coupling of the reduction gearing, and is mounted in the lower portion of casing 2 by means of bearing members 5 and 6. Worm wheel 3, and thus output coupling 4, are rotated at an angular velocity which is, for example, from 1/10 to 1/20 of the angular velocity of the motor armature.

Figure 3:
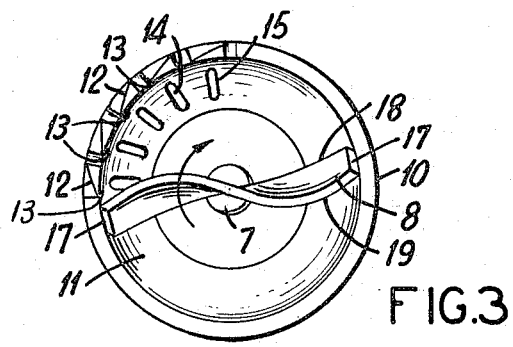
FIG. 3 is a bottom plan view of the bell or hood, with only some of the cutting edges of the bell being shown.

The comminuting attachment of the invention includes a drive shaft 7 arranged for disengageable interconnection with the output coupling 4 of the kitchen appliance. The lower end of shaft 7 has a knife blade 8 fixedly secured thereto to provide at least a pair of wings extending in generally radially directions from the shaft. Referring more particularly to FIG. 3, the wings of knife blade 8 are bent in a trailing direction, relative to radii of shaft 7, whose direction of rotation is indicated by an arrow. In addition, the wings may be twisted so that the end of each wing will form an acute angle with a bell member described hereinafter.

Figure 4:
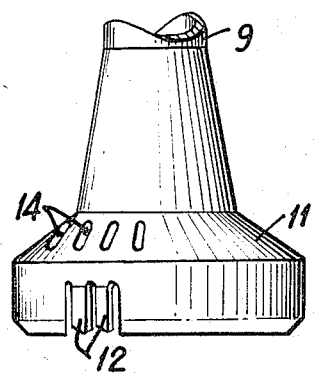
FIG. 4 is a side elevation of the bell or hood and the lower portion of the supporting tube for the drive shaft, with again only some of the cutting edges of the hood or bell being shown.

A support and bearing member, preferably in the form of a tubular sleeve 9, is operatively associated with and rotatably supports shaft 7. The lower end of support member or tube 9 is fixedly connected with a hood or bell which, in a particular example illustrated, is formed with a lower cylindrical wall 10 and an upper conical wall 11. Cylindrical wall 10 is formed with downwardly opening slots which are spaced substantially unifromly circumferentially thereof, and those slots form individual teeth 12 of which has an inwardly extending knife edge 13. Conical wall 11 is formed with circumferentially spaced slots 14 each of which has an inner knife edge 15. Furthermore, and as best seen in FIGS. 2 and 4, the lower periphery of cylindrical wall 10 is beveled or chisel edged as at 16, in order to facilitate penetration of the hood into the material to be cut.

Knife blade 8 is so constructed that its cutting edges, on the outer end of the wings, conform to the shape of the bell or hood. Each wing of knife blade 8 has its outer edge in the form of a knife edge 17, with its upper edge 18 also being formed as a knife edge. These two knife edges 17 and 18 cooperate, respectively, with the counter knife edges 13 and 15 of bell wall portions 10 and 11, respectively. The free lower edges of blade 8 are constructed as additional knife edges 19 which operate as pre-cutters effective directly upon the material to be cut. It should be understood that knife blade 8, instead of having two wings, could have more than two wings if considered necessary or desirable.

In the simplest form of the attachment, drive shaft 7 could be mounted in tubular support member 9 so as to be axially immovable relative to the support tube.

To use the attachment, shaft 7 and support tube 9 are connected with the kitchen appliance 1-2. In the particular embodiment illustrated, bearing member 9 has its tubular wall diverging upwardly to from a substantially conical enlargement 20 which carries a pin 22 extending parallel to the axis of drive shaft 7. When the attachment is to be coupled to the kitchen appliance, pin 21 engages in an aperture in casing 2 of the appliance so that bearing member 9 and bell 10-11 are fixed against rotation.

Drive shaft 7 is coupled into hub 4 in a known manner. The driving connection between hub 4 and shaft 7 is effected by engagement of a cross pin 22, extending diametrically of shaft 7, in downwardly opening diametrically opposite slots 23 in hub 4. Likewise in a known manner, the upper end of shaft 7 is formed with an annular groove 24 which, upon coupling of shaft 7 into hub 4, has a latching member 25 snapped thereinto, this latching member being mounted on casing 2. Latching member 25 is spring biased and may, in a known manner, be disengaged manually when the attachment is to be uncoupled from the kitchen appliance.

When the attachment is to be coupled to the kitchen appliance, the user merely turns shaft 7 by grasping knife blade 8 so that pin 22 can engage in slots 23.

Figure 5:
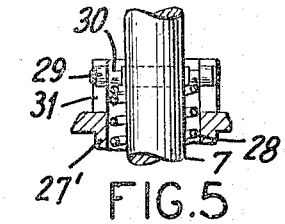
FIG. 5 is a sectional view to an enlarged scale, illustrating a portion of FIG. 2.

To prevent seizing of the cutting knife and to provide for cleaning of the appliance in an easier manner, the construction shown particularly in FIGS. 2 and 5 has been provided. A hollow hand wheel 27 is mounted rotatably within bearing member 9 so that it can be gripped and rotated through the medium of an opening 26 in enlargement 20 of member 9. Wheel 27 has a hub 27' which is rotatably mounted in member 9. A compression spring 28 embraces drive shaft 27 and has its lower end engaging hub 27' and its upper end engaging a cross pin 29 which is inserted through a diametric bore of shaft 7. Spring 28 biases shaft 7 upwardly of member 9 so that cutting knife 8 occupies a position fully within bell 10-11, as best illustrated in solid lines in FIG. 2. Pin 29 is provided with annular grooves 30 adjacent its outer ends, and the uppermost turn or coil of spring 28 engages these annular grooves. Thereby, pin 29 is secured against axial displacement thereof.

The coupling of pin 29 with wheel 27 or its hub 27' is effected by the pin being engaged in vertically extending slots 31 which are formed, for example, in hub 27'. By turning hand wheel 27, which is knurled on its outer surface, the user can bring shaft 7 into the correct angular position for coupling to hub 4.

When the attachment is uncoupled from the kitchen appliance, drive shaft 7 can be displaced by compressing spring 29 so that the lower end, mounting the blade 8, will occupy the position shown in FIG. 2 in dotted lines. In this position, the interior of bell 10-11 is readily accessible for cleaning purposes.

While a specific embodiment of the invention has been shown and described in detail to illustrate the application of the principles of the invention, it will be understood that the invention may be embodied otherwise without departing from such principles.

What is claimed is:

1. A rotating comminuting attachment for use with portable kitchen appliances, of the electric mixer-type and including an electric motor driving an output coupling through reduction gearing, said attachment comprising, in combination, a drive shaft arranged at its upper end for coupling to the output coupling of such appliance, for rotating at an angular velocity substantially less than that of the motor armature; a knife blade secured to the lower end of said shaft and including radially extending wings having first cutting edges at their radially outer ends; and a stationary downwardly opening bell surrounding said knife blade and formed with counter cutting edges cooperable with said first cutting edges to comminute the material to be cut; the lower edges of said blade wings being formed as cutting edges to pre-cut the material to be comminuted; said bell including a substantially cylindrical wall in the zone of said knife blade; said wings being bent in a trailing direction with respect to radii of said cylindrical bell wall, whereby to form acute angles with said cylindrical bell wall.

2. A rotating comminuting attachment for use with portable kitchen appliances, of the electric mixer-type and including an electric motor driving an output coupling through reduction gearing, said attachment comprising, in combination, a drive shaft arranged at its upper end for coupling to the output coupling of such appliance, for rotating at an angular velocity substantially less than that of the motor armature; a knife blade secured to the lower end of said shaft and including radially extending wings having first cutting edges at their radially outer ends; and a stationary downwardly opening bell surrounding said knife blade and formed with counter cutting edges cooperable with said first cutting edges to comminute the material to be cut; the lower edges of said blade wings being formed as cutting edges to pre-cut the material to be comminuted; said radially extending wings being offset intermediate their ends.

3. A rotating comminuting attachment for use with portable kitchen appliances, of the electric mixer-type and including an electric motor driving an output coupling through reduction gearing, said attachment comprising, in combination, a drive shaft arranged at its upper end for coupling to the output coupling of such appliance, for rotating at an angular velocity substantially less than that of the motor armature; a knife blade secured to the lower end of said shaft and including radially extending wings having first cutting edges at their radially outer ends; and a stationary downwardly opening bell surrounding said knife blade and formed with counter cutting edges cooperable with said first cutting edges to comminute the material to be cut; the lower edges of said blade wings being formed as cutting edges to pre-cut the material to be comminuted; said radial wings being twisted about lines extending outwardly from said drive shaft.

4. A rotating comminuting attachment, as claimed in claim 1, in which said bell includes a conical wall extending upwardly from said cylindrical wall; said conical wall being formed with counter cutting edges; the upper edges of said radially extending wings being formed as cutting edges cooperable with the counter cutting edges of said conical wall.

5. A rotating comminuting attachment for use with portable kitchen appliances, of the electric mixer-type and including an electric motor driving an output coupling through reduction gearing, said attachment comprising, in combination, a drive shaft arranged at its upper end for coupling to the output coupling of such appliance, for rotating at an angular velocity substantially less than that of the motor armature; a knife blade secured to the lower end of said shaft and including radially extending wings having first cutting edges at their radially outer ends; a stationary downwardly opening bell surrounding said knife blade and formed with counter cutting edges cooperable with said first cutting edges to comminute the material to be cut; the lower edges of said blade wings being formed as cutting edges to pre-cut the material to be comminuted; a support member rotatably supporting said drive shaft and having said bell secured to the lower end thereof; said drive shaft, said bell and said support member forming a unit disengageably securable to such appliance; said support member having means on its upper end interengageable with the casing of such appliance to restrain said support member and said bell against rotation; a spring engageable between said support member and said shaft and biasing said shaft upwardly of said support member to position said knife blade within said bell; said shaft and said knife blade being displaceable downwardly of said bell against the action of said spring; and a hub rotatable in said support member and surrounding said drive shaft; said compression spring having one end engaging an end of said hub and its other end in engagement with a cross pin in said shaft; said hub being formed with means interengageable with said pin to connect said driving shaft to said hub.

6. A rotating comminuting attachment, as claimed in claim 5, in which said hub has a pair of diametrically opposite upwardly opening slots therein engageable with said cross pin.

7. A rotating comminuting attachment, as claimed in claim 5, in which said support member is tubular and has an enlarged portion adjacent its upper end rotatably mounting said hub; said hub having a ring secured to its upper end and formed with a knurled outer surface; said enlargement of said tubular support member being formed with an opening for access to said ring for angular adjustment thereof.

References Cited by the Examiner
UNITED STATES PATENTS 2,789,800 4/1957 Willems _____ 146—68 X
3,109,471 11/1963 Highley _____ 146—182

FOREIGN PATENTS 1,208,148 9/1959 France.
572,069 1/1958 Italy.

ANDREW R. JUHASZ, *Primary Examiner.*

W. GRAYDON ABERCROMBIE, *Examiner.*